United States Patent [19]

Sawada et al.

[11] Patent Number: 5,773,781
[45] Date of Patent: Jun. 30, 1998

[54] PROFILING ELECTRICAL DISCHARGE MACHINING APPARATUS

[75] Inventors: Kiyoshi Sawada, Sunto-gun; Shun'ichi Odaka; Kouji Yamaguchi, both of Oshino-mura, all of Japan

[73] Assignee: Fanuc, Ltd., Yamanashi, Japan

[21] Appl. No.: 846,499

[22] Filed: Apr. 28, 1997

Related U.S. Application Data

[63] Continuation-in-part of Ser. No. 307,778, Oct. 7, 1994, abandoned.

[30] Foreign Application Priority Data

Feb. 10, 1993 [JP] Japan ..................................... 5-045750

[51] Int. Cl.$^6$ .............................. B23H 1/00; B23H 7/26
[52] U.S. Cl. .......................................................... 219/69.2
[58] Field of Search ................................ 219/69.2, 69.15, 219/69.16

[56] References Cited

U.S. PATENT DOCUMENTS

| | | | |
|---|---|---|---|
| 3,053,965 | 9/1962 | Kintzel ..................................... | 219/69.2 |
| 3,610,865 | 10/1971 | Van Ossenbruggen ................ | 219/69.2 |
| 4,485,286 | 11/1984 | Inoue ..................................... | 219/69.2 |
| 5,340,959 | 8/1994 | Sawada et al. .......................... | 219/69.2 |

FOREIGN PATENT DOCUMENTS

| | | | |
|---|---|---|---|
| 839400 | 4/1970 | Canada ................................... | 219/69.2 |
| 2577156 | 8/1986 | France . | |
| 56-89435 | 7/1981 | Japan ................................... | 219/69.16 |
| 58-40226 | 3/1983 | Japan ................................... | 219/69.17 |
| 62-287930 | 12/1987 | Japan ................................... | 219/69.15 |
| 62-292322 | 12/1987 | Japan ................................... | 219/69.2 |
| 2-279227 | 11/1990 | Japan ................................... | 219/69.2 |
| 3-60927 | 3/1991 | Japan ................................... | 219/69.2 |
| 3-60928 | 3/1991 | Japan . | |
| 3-60929 | 3/1991 | Japan ................................... | 219/69.16 |
| 3-79236 | 4/1991 | Japan . | |
| 3-79237 | 4/1991 | Japan ................................... | 219/69.15 |
| 4-331026 | 11/1992 | Japan ................................... | 219/69.15 |
| 6-8058 | 1/1994 | Japan ................................... | 219/69.16 |
| 1024201 | 6/1983 | U.S.S.R. ............................... | 219/69.2 |
| 1419838 | 8/1988 | U.S.S.R. ............................... | 219/69.16 |
| 2118880 | 11/1983 | United Kingdom . | |

OTHER PUBLICATIONS

Patent Abstracts of Japan, May 31, 1991, JP–A–03 060928.
Patent Abstracts of Japan, Aug. 29, 1990, JP–A–02 152729.
Patent Abstracts of Japan, Sep. 5, 1979, JP–A–03 079897.
Patent Abstracts of Japan, Jun. 24, 1991, JP–A–03 079236.
Microfilm of the specification and drawings annexed to the written application of Japanese Utility Model Application No. 91543/1987.
"3R EDM Tooling" Catalog, pp. 1–47, Unknown Author, Unknown Publication Date.

*Primary Examiner*—Geoffrey S. Evans
*Attorney, Agent, or Firm*—Staas & Halsey

[57] ABSTRACT

An oscillating device is fixed to the lower end of a column of a profiling electrical discharge machining apparatus, and an electrode holder for holding a tool electrode is attached to the oscillating device. The oscillating device is composed of a block formed of a material with suitable elasticity and right- and left-hand piezoelectric elements embedded under a pilot pressure in the block. By alternately driving these piezoelectric elements, the tool electrode is subjected to a motion such that a displacement much smaller than the size of a gap between the tool electrode and a workpiece is repeated during a machining operation with a short period in a predetermined direction and a direction substantially opposite thereto.

5 Claims, 3 Drawing Sheets

PROFILING ELECTRICAL DISCHARGE MACHINING APPARATUS

This application is a continuation of application Ser. No. 08/307,778, filed Oct. 7, 1994, now abandoned.

BACKGROUND OF THE INVENTION

1. Field of the Invention

The present invention relates to an improvement of a profiling electrical discharge machining apparatus which generates electrical discharge between a tool electrode and a workpiece in a machining fluid, thereby machining the workpiece by removing the material.

2. Description of the Invention

Profiling electrical discharge machining is a machining method in which machining is carried out with electrical discharge generated between a tool electrode and a workpiece in a machining fluid while they are moved relatively. In this case, tailings, decomposition products from the machining fluid or bubbles are produced in an electrical discharge gap between the tool electrode and the workpiece. These tailings and the like cause abnormal electrical discharge, and make it hard to maintain a satisfactory electrical discharge state, so that they must be quickly removed from the electrical discharge gap.

Conventionally, these tailings and the like are removed by a method in which the tool electrode is jumped in order to urge the machining fluid to flow in the electrical discharge gap, or by injection of the machining fluid or introduction of a jet into the electrical discharge gap, or suction of the machining fluid existent in the electrical discharge gap.

According to a method in which the tool electrode is subjected to the jumping motion, the electrical discharge machining has to be suspended during the jumping motion, which entails a negative effect such as the slowdown of the machining rate. In the case of the method in which the machining fluid is jetted out into the electrical discharge gap, the jet flow may be uneven, thereby sometimes causing uneven consumption of the tool electrode and uneven machining speed for the workpiece, which entails poor machining accuracy. As the depth of machining increases, moreover, it becomes hard to exert the influence of the injection upon the whole area of the electrical discharge gap. In the case where the jetting or suction of the machining fluid is utilized, furthermore, holes for the machining fluid jetting or ejection must be formed in the tool electrode or the workpiece before starting the electrical discharge machining, so that the working conditions are adversely restricted.

Besides the above methods, there is a so-called rocking machining process, that is, a method in which the tailings and the like are prevented from remaining in a specific location by controlling servo feed of the tool electrode for movement in multiple directions, that is, the directions in X, Y, and Z axes. According to this method, however, the electrical discharge position cannot be dispersed effectively to cope with the state of concentrated electrical discharge, although the electrical discharge position can be changed.

SUMMARY OF THE INVENTION

The object of the present invention is to provide a profiling electrical discharge machining apparatus which generates electrical discharge between a tool electrode and a workpiece to remove the material from a workpiece for machining, characterized in that it is capable of not only effectively removing the tailings from the electric discharge gap but also effectively dispersing the position of the electric discharge.

In order to achieve the above object, according to one aspect of the present invention, an oscillating device including an oscillating element for generating a short-period oscillation with a minute displacement is provided on the side of the tool electrode or the workpiece, whereby a relative motion with a displacement much smaller than the size of a gap between the tool electrode and the workpiece is brought about alternately and at a high speed in a predetermined direction and a direction substantially opposite thereto during the machining operation.

According to another aspect of the present invention, an oscillating device is fixed to the lower end of a column of an electrical discharge machining apparatus, and an electrode holder for holding a tool electrode is attached to the oscillating device. The oscillating device is composed of a block formed of a material with suitable elasticity and one or two or more piezoelectric elements embedded under a pilot pressure in the block so as to be oriented individually in a predetermined direction. These piezoelectric elements are connected to a power source for generating a voltage varying continuously or intermittently, whereby a short-period oscillation with a displacement much smaller than the size of a gap between the tool electrode and a workpiece is brought about continuously or intermittently with respect to the tool electrode during the machining operation.

Preferably, the one or more piezoelectric elements are embedded in equal numbers in the block constituting the oscillating device, in bisymmetrical positions with respect to the center line of the column vertically penetrating the block, and the power source is used alternately to drive the piezoelectric element or piezoelectric element group on one side, right- or left-hand, and the piezoelectric element or piezoelectric element group on the other side.

According to still another aspect of the present invention, an oscillating device is formed by embedding, under preloaded pressure, one or two or more piezoelectric elements in a machining table for carrying a workpiece thereon or a board supporting the machining table. These piezoelectric elements are connected to a power source for generating a voltage varying continuously or intermittently, whereby a short-period oscillation with a displacement much smaller than the size of a gap between a tool electrode and the workpiece is brought about continuously or intermittently with respect to the workpiece during the machining operation.

According to the present invention, as described above, the oscillation with the relative displacement considerably smaller than the size of the gap between the tool electrode and the workpiece during the machining operation is applied at high speed between the tool electrode and the workpiece during the machining operation, so that tailings in the electrical discharge gap between the tool electrode and the workpiece can surely be made to flow out by the effect of the pumping action deriving from the oscillation without hindering the continuation of the electrical discharge in the electrical discharge gap. Since the electrical discharge position can be dispersed effectively by the oscillation, a satisfactory electrical discharge state can be maintained.

DETAILED DESCRIPTION OF THE PREFERRED EMBODIMENTS

Figure 1:
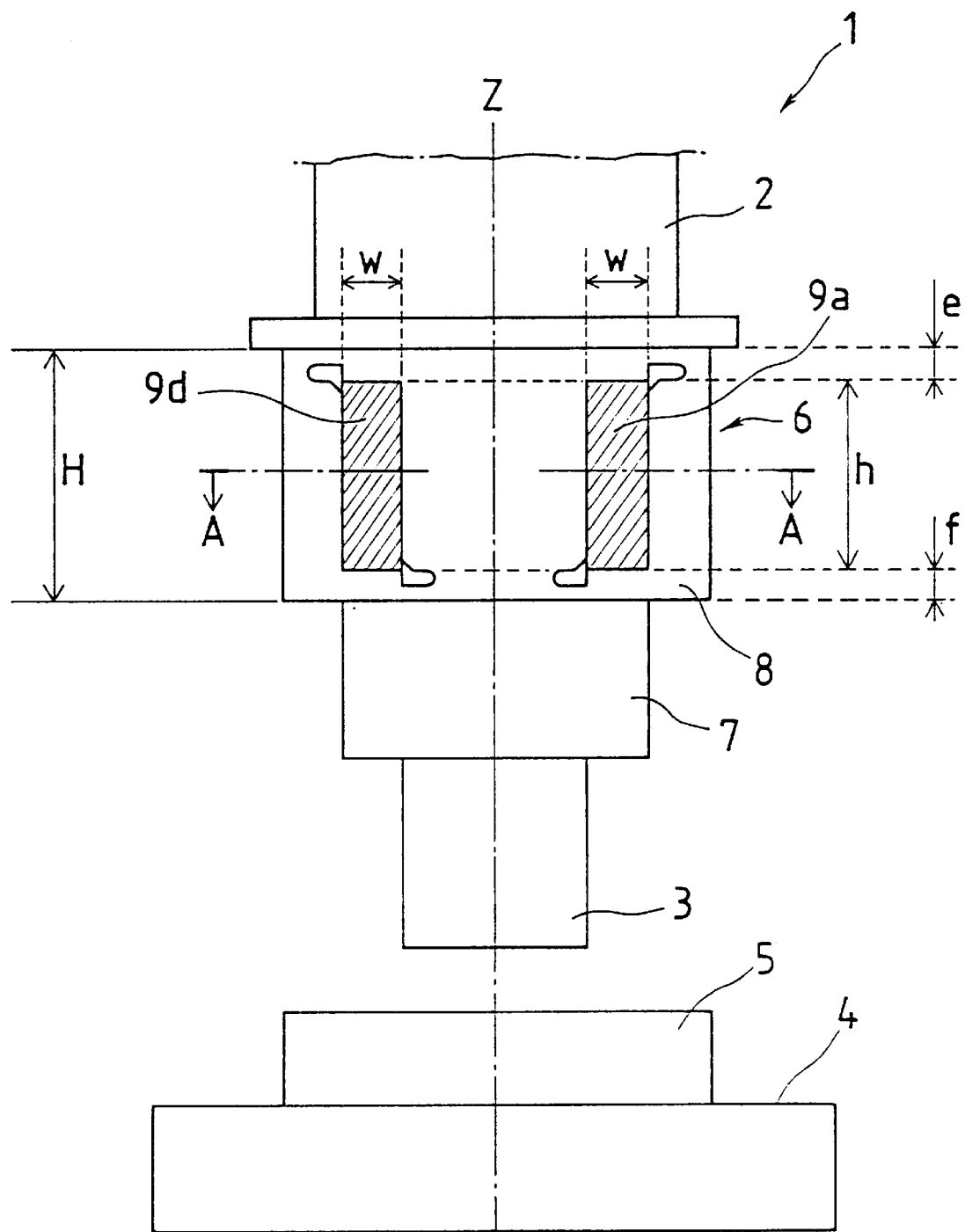
FIG. 1 is a front view schematically showing part of an electrical discharge machining apparatus according to one embodiment of the present invention and a workpiece.

FIG. 1 shows a state in which a tool electrode 3 mounted on a profiling electrical discharge machining apparatus 1 faces a workpiece 5 placed on a machining table 4. Referring to FIG. 1, an oscillating device 6, which will be described later in detail, is fixed to the lower end of a column 2 of the profiling electrical discharge machining apparatus 1, and an electrode holder 7 is fixed to the lower end of the oscillating device 6. The tool electrode 3 is mounted on the electrode holder 7 through a chuck (not shown). In this embodiment, the tool electrode 3 is in the form of a flat-bottomed cylinder. The respective central axes of the oscillating device 6, electrode holder 7, and tool electrode 3 are arranged in line with a central axis z of the column 2.

Figure 2:
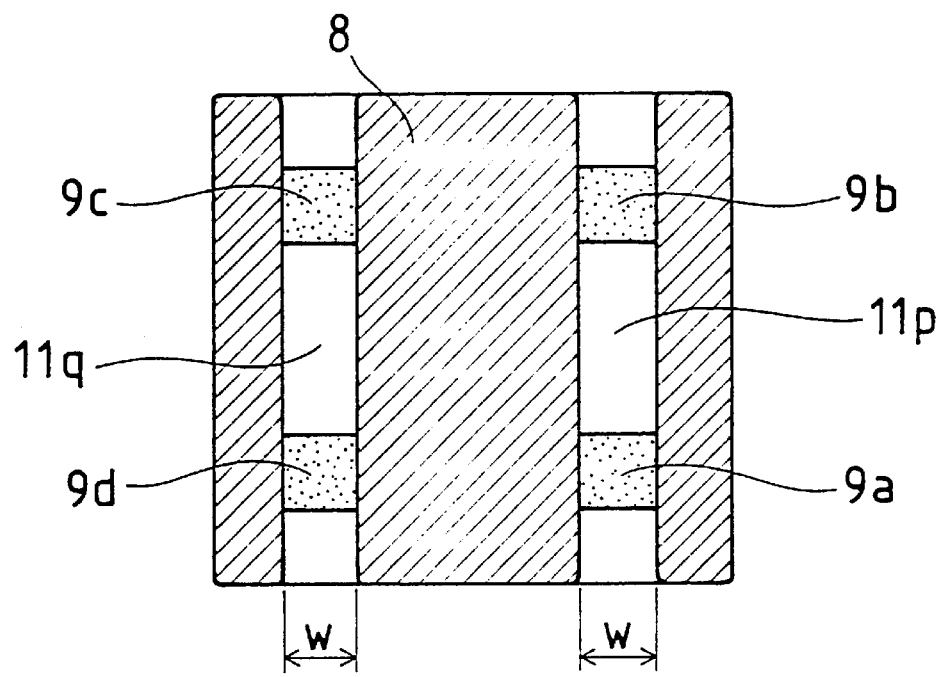
FIG. 2 is a sectional view taken along line A—A of FIG. 1.

As shown in the front view of FIG. 1 and the sectional view of FIG. 2, the oscillating device 6 comprises a block 8, formed of a metal material with predetermined elasticity and having a square sectional shape, and four piezoelectric elements 9a, 9b, 9c and 9d embedded individually in internal spaces 11p and 11q formed in the block 8 so that they are arranged around the central axis (or the aforesaid central axis z) that is, on the right and left and in front and rear of the block, with their longitudinal direction parallel to the central axis z.

As shown in FIGS. 1 and 2, the internal spaces 11p and 11q are formed of two holes, right and left, each of which has a predetermined height h not exceeding the height (in the direction parallel to the central axis z) of the block 8 and a predetermined width w, that is, has a section measuring h by w, and longitudinally penetrate the block 8. As seen from FIG. 1, therefore, those planes which respectively correspond to the ceiling and floor of each of the internal spaces 11p and 11q are situated inward from the top and bottom of the block 8 at distances e and f, respectively.

As shown in FIG. 2, moreover, the one pair of piezoelectric elements 9a and 9b are fitted in the one internal space 11p in a manner such that their upper and lower ends exert a predetermined compressive force on the ceiling and floor of the internal space 11p, respectively, in a nonoperating state. Also, another pair of piezoelectric elements 9c and 9d are fitted in the other internal space 11q in like manner. The piezoelectric elements 9a to 9d are composed of a plurality of ceramic piezoelectric elements which are bonded to one another in the vertical direction, that is, in the direction parallel to the central axis z. In this manner, the piezoelectric elements 9a to 9d can be fixed securely in the spaces 11p and 11q in the block 8 without using any fixing means such as screws.

Since the oscillating device 6 is constructed in the manner described above, the piezoelectric elements 9a to 9d are kept compressed in the longitudinal direction (vertical direction) in the internal spaces 11p and 11q even when they are not actuated by a voltage from a power source. When the piezoelectric elements 9a to 9d are actuated, the block 8 is distorted in the vertical direction, depending on its shape and material, by a force of pressure to which the block 8 is subjected when the piezoelectric elements are extended. As compared with its upper part connected to the column 2, however, the lower part of the block 8, along with the oscillating device 7 and the tool electrode 3, constitutes a free end, so that the block 8 yields downward only.

Figure 4:
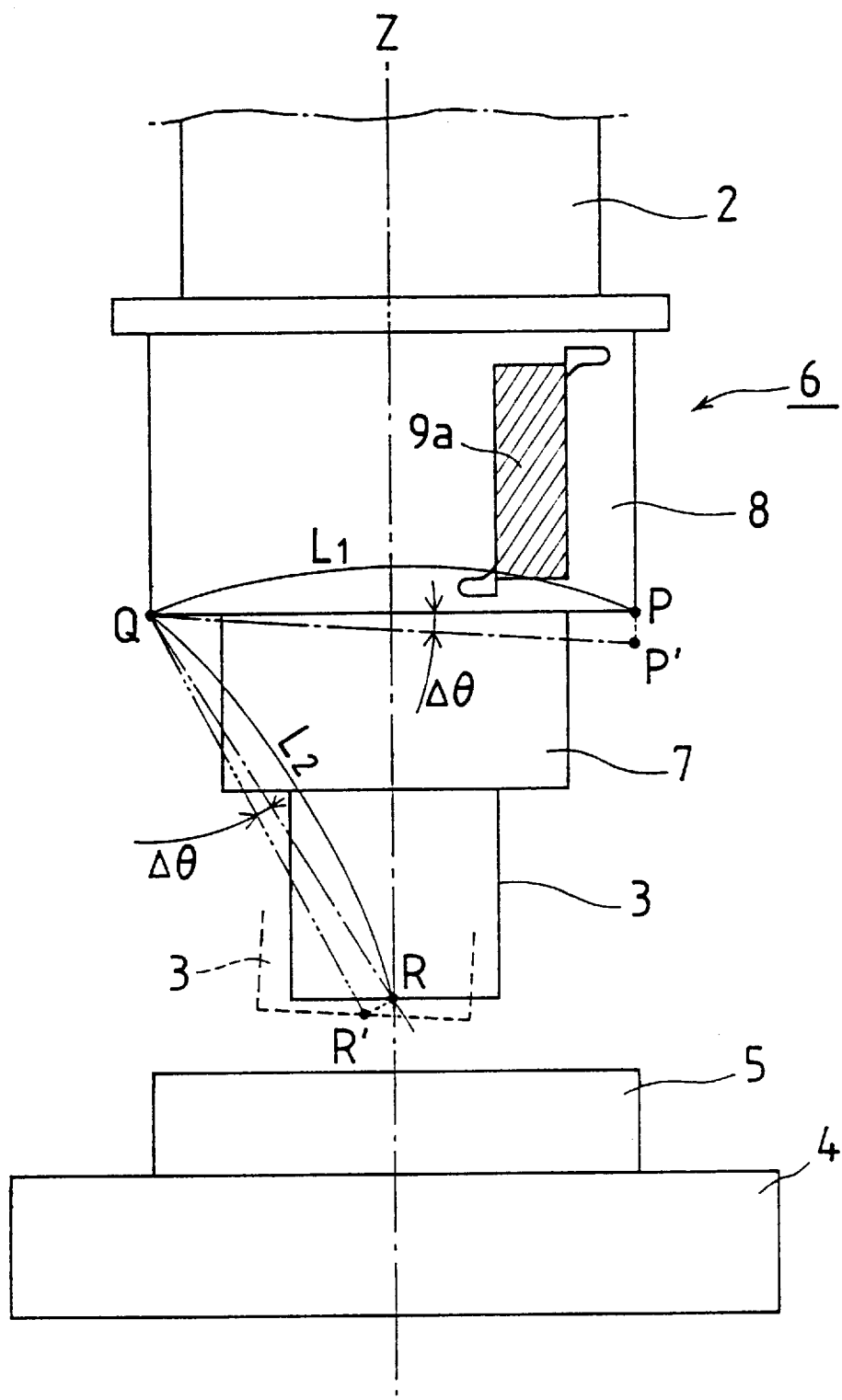
FIG. 4 is a front view for illustrating the oscillation of the tool electrode of the electrical discharge machining apparatus shown in FIG. 1.

Referring now to FIG. 4, a shift of the tool electrode 3 will be described, the shift being caused when the right- or left-hand side of the block 8 of the oscillating device 6 moves slightly in the vertical direction as one of the two pairs of piezoelectric elements 9a, 9b and 9c, 9d extend.

When sinusoidal voltages with a half-cycle phase difference from each other are applied to the right-hand piezoelectric elements 9a and 9b and the left-hand piezoelectric elements 9c and 9d, the right- and left-hand piezoelectric elements 9a, 9b and 9c, 9d alternately extend in succession. In this case, the electrical discharge machining apparatus 1 is constructed so that the width of the block 8 of the oscillating device 6, that is, the distance (L1; normally about 70 mm) between the right-hand end P and left-hand end Q of the block 8, is equal to the distance (L2) between the left-hand end Q of the block 8 and the end center R of the tool electrode, as shown in FIG. 4. Thus, the points P, Q and R constitute vertexes of an equilateral triangle respectively.

When the right-hand piezoelectric elements 9a and 9b simultaneously extend as they are supplied with the sinusoidal voltages, in the oscillating device 6 of this type, the right-hand end P of the block 8 is shifted downward to P' by the piezoelectric element pair 9a and 9b. Since the left-hand piezoelectric elements 9c and 9d are not actuated, on the other hand, no displacement occurs at the left-hand end Q of the block 8. Thus, the lower end face of the block 8, which is represented by a segment PQ, shifts for a minute angle Δθ from PQ to P'Q.

This displacement, that is, angular displacement (Δθ in the clockwise direction) of one side PQ of an equilateral triangle PQR is followed by an angular displacement by Δθ of another side QR of the same equilateral triangle, so that the position of the point R shifts to R', as shown in FIG. 4. If the displacement from the point P to the point P' is 20 μm, a segment PP' in FIG. 4 may be considered to be perpendicular to the segment PQ, and likewise, a segment RR' may be considered to be perpendicular to the segment QR, since the displacement angle Δθ is a very narrow angle. Accordingly, the segment PR' intersects the segment QR at right angles thereto, that is, at an angle of 60° to the central axis z, and thus the distance between the points R and R', like the distance between the points P and P', is 20 μm. Thus, the horizontal and vertical components of the segment RR' have lengths given by 20×cos60°=14 (μm) and 20×sin60°= 10 (μm) respectively.

As seen from the above description, if the right-hand end P of the block 8 is shifted downward 20 μm by simultaneously extending only the right-hand piezoelectric elements 9a and 9b fitted in the block 8, the end center R of the tool electrode will be shifted 20 μm in the direction at 60° to the central axis z, that is, about 14 μm to the left and 10 μm downward. Likewise, if the left-hand end P of the block 8 is shifted downward 20 μm in like manner by simultaneously extending only the left-hand piezoelectric elements 9c and 9d, the end center R of the tool electrode 3 will be shifted about 14 μm to the right and 10 μm downward. If the right-hand piezoelectric elements 9a and 9b and the left-hand piezoelectric elements 9c and 9d are alternately extended in predetermined cycles, therefore, the tool electrode 3 can be caused to oscillate so that it is continuously subjected to repeated minute displacements from side to side with respect to the central axis z.

The above is a description of the oscillation of the tool electrode 3 for the case where the electrical discharge machining apparatus 1 is constructed so that the segment PQ is equal to the segment QR (L1=L2) as in FIG. 4. On the other hand, in the case where the segment PQ is longer than the segment QR (L1<L2), the segment RR' crosses the central axis z at an angle of 60° or less, so that the horizontal component is shorter than in the previous case, and the vertical component is longer. Conversely, if the segment PQ is shorter than the segment QR (L1>L2), the segment RR' crosses the central axis z at an angle of 60° or more, so that the horizontal component is longer, and the vertical component is shorter.

Electrical discharge machining operation is performed with the workpiece 5 placed on the table 4 in a machining fluid and with the tool electrode 3 located close to the surface of the workpiece 5. At this time, the aforesaid oscillating device 6 is actuated. During the electrical discharge machining, electrical discharge occurs with a predetermined electrical discharge gap (about 100 $\mu$m in the case of rough machining) maintained between the lower surface of the tool electrode 3 and the surface of the workpiece 5. At the same time, the sinusoidal voltages are supplied to the two pairs of piezoelectric elements 9a, 9b and 9c, 9d through their corresponding input terminals so that the pairs are driven alternately. Thereupon, the tool electrode 3 continuously and repeatedly oscillates from side to side with respect to the central axis z of the column 2, causing the electrical discharge to be generated between itself and the workpiece 5.

Figure 3:
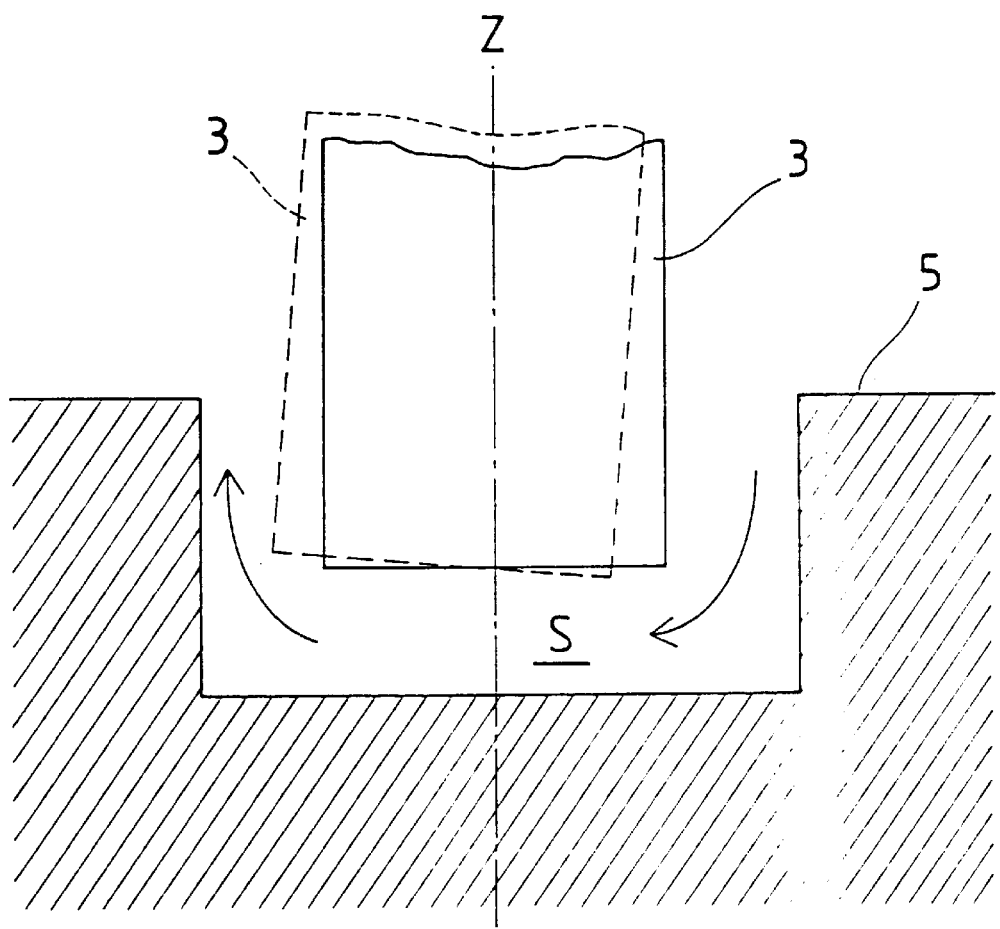
FIG. 3 is a front view for illustrating the oscillation of a tool electrode of the electrical discharge machining apparatus shown in FIG. 1 during machining operation.

FIG. 3 schematically shows a state established when the machining has progressed to a certain depth. In this situation, the tool electrode 3 is shifted from a neutral position indicated by full line to a tilted position indicated by broken line by means of the oscillating device 6. This shift is carried out at a high speed of the microsecond order. As the tool electrode 3 moves from the full-line position to the broken-line position, the tool electrode 3 provides a pumping effect causing not only the machining fluid in the electrical discharge gap S to be jetted out of the electrical discharge gap S but also the outside machining fluid to be introduced into the electrical discharge gap S. This effect causes the machining fluid in the electrical discharge gap S to flow as indicated by the arrows, thereby also causing the tailings to be discharged quickly from the electrical discharge gap S. Since this pumping action depends on the displacement of the tool electrode 3 itself, it is not so significantly influenced by the machining depth.

The lateral deflection of the tool electrode 3 due to the inclination of the distal end thereof is 20 $\mu$m in the direction intersecting the central axis z at an angle of 60° thereto (i.e., 14 $\mu$m in the horizontal direction and 10 $\mu$m in the vertical direction), as mentioned before. Accordingly, there is no possibility of having the distal end of the tool electrode 3 run against the workpiece 5 due to its inclination, since the average machining gap for rough machining is normally 100 $\mu$m or more.

As the tool electrodes inclines, its position for the shortest opposite distance (electrical discharge gap) between the lower surface of the tool electrode 3 and the workpiece 5 varies continually, so that even if concentrated electrical discharge occurs in a certain place in the electrical discharge gap, it can be dispersed at once.

The direction of oscillation of the tool electrode 3 is not limited to the lateral direction for the case of the embodiment. Alternatively, the piezoelectric elements 9b and 9c and the piezoelectric elements 9a and 9d may be combined respectively to form front and rear pairs so that the tool electrode can be oscillated back and forth by alternately driving the these pairs. Moreover, the direction of oscillation of the tool electrode 3 caused by the inclination can be changed by successively combining the lateral and longitudinal pairs composed of the piezoelectric elements 9a to 9d or by singly using each of the piezoelectric elements 9a to 9d. If this is done,.the flowing direction of the machining fluid in the electrical discharge gap S changes, so that localized deposition of tailings and the like in a particular spot or other like situations can be prevented.

As a mode of oscillation of the tool electrode 3, moreover, a tilting motion may be generated while changing the direction of the oscillation such that the tool electrode 3 is always shifted in only one direction from the neutral position.

Furthermore, the voltages to be applied to the respective input terminals 6 of the piezoelectric elements 9a to 9d are not limited to the sinusoidal voltages as in the aforementioned case; they may be pulsating voltages with a predetermined level, predetermined period and predetermined duty ratio. In this case, the oscillation of the tool electrode 3 is not continuous but intermittent.

Although the piezoelectric elements 9 are used as the drive source for oscillating the tool electrode 3 according to the foregoing embodiment, they may be replaced with an electrostatic motor or electromagnet.

In the embodiment described above, the tool electrode 3 is oscillated by causing it to be displaced finely from one side to the other by means of the oscillating device 8. Instead of oscillating the tool electrode 3 by means of the oscillating device 8, however, the workpiece 5 may be oscillated. In this case, the piezoelectric elements are embedded in the table 4, placed in a machining fluid tank and carrying the workpiece thereon, or in a board supporting the table 4.

We claim:

1. A profiling electrical discharge machining apparatus which generates an electrical discharge between a tool electrode and a workpiece during a machining operation on the workpiece, comprising:

an oscillating device including an oscillating element generating a short-period oscillation with a minute displacement, attached to the tool electrode, to alternately incline said tool electrode between at least two different inclination positions, to thereby reciprocally shift a distal end portion of said tool electrode between a first direction and a second direction by a displacement amount smaller than a size of a gap between the tool electrode and the workpiece during the machining operation.

2. A profiling electrical discharge machining apparatus according to claim 1, wherein said oscillating element of said oscillating device is an electromagnet.

3. A profiling electrical discharge machining apparatus according to claim 1, wherein said oscillating element of said oscillating device is an electrostatic motor.

4. A profiling electrical discharge machining apparatus designed to generate an electrical discharge between a tool electrode and a workpiece during a machining operation on the workpiece, comprising:

an oscillating device fixed to a lower end of a column of the electrical discharge machining apparatus, the oscillating device being fitted with an electrode holder for holding the tool electrode, said oscillating device being formed from a material with suitable elasticity and embedding a pair of piezoelectric elements opposite to each other in a predetermined direction under a pre-loaded pressure, the pair of piezoelectric elements being connected to a power source which generates a voltage varying continuously or intermittently to alternately provide a short-period oscillation to each one of said pair of piezoelectric elements to alternately incline said tool electrode between at least two different inclination positions, to thereby reciprocally shift a distal end portion of said tool electrode between a first direction and a second direction by a displacement amount smaller than a size of a gap between the tool electrode and the workpiece during the machining operation.

5. A profiling electrical discharge machining apparatus according to claim 4, wherein said pair of piezoelectric elements are embedded in bisymmetrical positions with respect to a center line of the column vertically penetrating the oscillating device, and said power source alternately drives one in the pair of piezoelectric elements on one side of said center line and the other one in the pair of piezoelectric elements on the other side of said center line.

* * * * *